US011392942B2

(12) United States Patent
Ma et al.

(10) Patent No.: US 11,392,942 B2
(45) Date of Patent: *Jul. 19, 2022

(54) METHOD, APPARATUS AND ELECTRONIC DEVICE FOR BLOCKCHAIN TRANSACTIONS

(71) Applicant: ADVANCED NEW TECHNOLOGIES CO., LTD., Grand Cayman (KY)

(72) Inventors: Baoli Ma, Hangzhou (CN); Zheng Liu, Hangzhou (CN); Shan Yin, Hangzhou (CN); Wenbin Zhang, Hangzhou (CN); Lichun Li, Hangzhou (CN)

(73) Assignee: ADVANCED NEW TECHNOLOGIES CO., LTD., George Town (KY)

( * ) Notice: Subject to any disclaimer, the term of this patent is extended or adjusted under 35 U.S.C. 154(b) by 399 days.

This patent is subject to a terminal disclaimer.

(21) Appl. No.: 16/554,507

(22) Filed: Aug. 28, 2019

(65) Prior Publication Data

US 2020/0074459 A1     Mar. 5, 2020

(30) Foreign Application Priority Data

Aug. 30, 2018    (CN) .......................... 201811003743.9

(51) Int. Cl.
     *G06Q 20/38*      (2012.01)
     *H04L 9/00*       (2022.01)
     *H04L 9/32*       (2006.01)

(52) U.S. Cl.
     CPC ....... *G06Q 20/389* (2013.01); *G06Q 20/3829* (2013.01); *H04L 9/008* (2013.01);
     (Continued)

(58) Field of Classification Search
None
See application file for complete search history.

(56) References Cited

U.S. PATENT DOCUMENTS

| 7,568,615 B2 | 8/2009 | Corona et al. |
| 9,569,771 B2 * | 2/2017 | Lesavich ............ H04L 65/4084 |

(Continued)

FOREIGN PATENT DOCUMENTS

| CN | 106549749 A | 3/2017 |
| CN | 106845960 A | 6/2017 |

(Continued)

OTHER PUBLICATIONS

Y. Wang and J. Gao, "A Regulation Scheme Based on the Ciphertext-Policy Hierarchical Attribute-Based Encryption in Bitcoin System," in IEEE Access, vol. 6, pp. 16267-16278, 2018, doi: 10.1109/ACCESS.2018.2814620. https://ieeexplore.ieee.org/stamp/stamp.jsp?tp=&arnumber=8314106 (Year: 2018).*

(Continued)

*Primary Examiner* — El Mehdi Oussir (57) ABSTRACT

A method for implementing blockchain-based transactions comprises: determining a transaction amount to be remitted from a blockchain account of a remitter into a blockchain account of a receiver, wherein the blockchain account of the remitter records a homomorphic encryption ciphertext of the remitter's balance, the blockchain account of the receiver records a homomorphic encryption ciphertext of the receiver's balance; generating a homomorphic encryption ciphertext of the transaction amount with respect to the remitter and a homomorphic encryption ciphertext of the transaction amount with respect to the receiver; and submitting to the blockchain a transaction for the homomorphic encryption ciphertext of the transaction amount with respect to the remitter to be subtracted from the homomorphic encryption ciphertext of the remitter's balance and for the homomorphic encryption ciphertext of the transaction amount with respect to the receiver to be added to the homomorphic encryption ciphertext of the receiver's balance.

18 Claims, 4 Drawing Sheets

(52) U.S. Cl.
CPC ....... *H04L 9/3239* (2013.01); *G06Q 2220/00* (2013.01); *H04L 2209/38* (2013.01); *H04L 2209/56* (2013.01)

(56) References Cited

U.S. PATENT DOCUMENTS

| | | | |
|---|---|---|---|
| 9,774,578 | B1 | 9/2017 | Ateniese et al. |
| 9,990,504 | B1 | 6/2018 | Chapman et al. |
| 10,022,613 | B2* | 7/2018 | Tran .................... G06F 3/0304 |
| 10,057,255 | B2 | 8/2018 | Votaw et al. |
| 10,148,646 | B2 | 12/2018 | Votaw et al. |
| 10,163,080 | B2 | 12/2018 | Chow et al. |
| 10,262,351 | B2 | 4/2019 | Boemi et al. |
| 10,270,599 | B2 | 4/2019 | Nadeau et al. |
| 10,275,739 | B2 | 4/2019 | Hanis et al. |
| 10,333,706 | B2 | 6/2019 | Smith et al. |
| 10,339,523 | B2 | 7/2019 | Mcdonough et al. |
| 10,615,960 | B2* | 4/2020 | Zhang .................. H04L 9/0643 |
| 10,817,872 | B2* | 10/2020 | Lin ....................... H04L 9/3239 |
| 11,080,665 | B1 | 8/2021 | Poelstra et al. |
| 2004/0260926 | A1 | 12/2004 | Arditti Modiano et al. |
| 2009/0136033 | A1 | 5/2009 | Sy |
| 2010/0078471 | A1 | 4/2010 | Lin et al. |
| 2013/0073432 | A1 | 3/2013 | Mulholland |
| 2013/0230168 | A1 | 9/2013 | Takenouchi |
| 2013/0238491 | A1 | 9/2013 | Bouey et al. |
| 2013/0254098 | A1 | 9/2013 | Holland |
| 2014/0334622 | A1* | 11/2014 | Smyth .................... H04L 9/008 713/168 |
| 2015/0088756 | A1 | 3/2015 | Makhotin et al. |
| 2015/0333905 | A1* | 11/2015 | Parann-Nissany .... H04L 63/062 380/44 |
| 2016/0078431 | A1 | 3/2016 | Ramachandran et al. |
| 2016/0162897 | A1 | 6/2016 | Feeney |
| 2016/0253663 | A1 | 9/2016 | Clark et al. |
| 2016/0260160 | A1 | 9/2016 | Cheng et al. |
| 2016/0261411 | A1 | 9/2016 | Yau et al. |
| 2016/0275461 | A1 | 9/2016 | Sprague et al. |
| 2016/0314462 | A1 | 10/2016 | Hong et al. |
| 2016/0321654 | A1* | 11/2016 | Lesavich ............. G06Q 20/065 |
| 2016/0342978 | A1* | 11/2016 | Davis ................. G06Q 20/0655 |
| 2016/0358165 | A1* | 12/2016 | Maxwell ............ G06Q 20/3829 |
| 2017/0046698 | A1 | 2/2017 | Haldenby et al. |
| 2017/0048209 | A1 | 2/2017 | Lohe et al. |
| 2017/0124483 | A1 | 5/2017 | Huang |
| 2017/0149796 | A1* | 5/2017 | Gvili ..................... H04L 9/3239 |
| 2017/0154331 | A1 | 6/2017 | Voorhees |
| 2017/0228822 | A1 | 8/2017 | Creighton, IV et al. |
| 2017/0236123 | A1 | 8/2017 | Ali et al. |
| 2017/0243241 | A1 | 8/2017 | Boutelle et al. |
| 2017/0289111 | A1 | 10/2017 | Voell et al. |
| 2017/0316479 | A1* | 11/2017 | Kurian ................ G06F 16/9535 |
| 2017/0330179 | A1 | 11/2017 | Song et al. |
| 2017/0364705 | A1 | 12/2017 | Villars |
| 2017/0366357 | A1 | 12/2017 | Pattanaik et al. |
| 2018/0041345 | A1* | 2/2018 | Maim ................... G06F 21/31 |
| 2018/0089644 | A1 | 3/2018 | Chen et al. |
| 2018/0205555 | A1 | 7/2018 | Watanabe et al. |
| 2018/0253702 | A1 | 9/2018 | Dowding |
| 2018/0349894 | A1* | 12/2018 | Patrinos .............. G06Q 20/383 |
| 2018/0365688 | A1 | 12/2018 | He et al. |
| 2018/0365691 | A1 | 12/2018 | Sanders et al. |
| 2019/0005470 | A1 | 1/2019 | Uhr et al. |
| 2019/0020629 | A1* | 1/2019 | Baird, III .................. H04L 9/12 |
| 2019/0036712 | A1 | 1/2019 | Qiu |
| 2019/0043043 | A1* | 2/2019 | Saraniecki ........... G06Q 20/382 |
| 2019/0044734 | A1* | 2/2019 | Lancashire ........ G06Q 20/3825 |
| 2019/0080392 | A1 | 3/2019 | Youb et al. |
| 2019/0164153 | A1* | 5/2019 | Agrawal .............. H04L 9/3239 |
| 2019/0182027 | A1 | 6/2019 | Kipnis et al. |
| 2019/0228407 | A1 | 7/2019 | Wu et al. |
| 2019/0236300 | A1 | 8/2019 | Guo et al. |
| 2019/0280880 | A1* | 9/2019 | Zhang .................. H04L 9/3247 |
| 2019/0303621 | A1* | 10/2019 | Baset .................... H04L 9/0637 |
| 2019/0349190 | A1 | 11/2019 | Smith et al. |
| 2019/0358515 | A1* | 11/2019 | Tran ........................ G06F 1/163 |
| 2019/0385162 | A1 | 12/2019 | Zhang et al. |
| 2019/0386814 | A1* | 12/2019 | Ahmed .................... H04L 9/008 |
| 2019/0394019 | A1 | 12/2019 | Gao |
| 2020/0028693 | A1 | 1/2020 | Wu et al. |
| 2020/0097958 | A1* | 3/2020 | Imoto ................. G06F 16/2365 |
| 2020/0150994 | A1 | 5/2020 | Thompson et al. |
| 2020/0349563 | A1* | 11/2020 | Lu ........................... G06Q 40/00 |
| 2021/0028939 | A1 | 1/2021 | Trevethan |
| 2021/0081216 | A1* | 3/2021 | Komarov ............ G06F 9/44505 |
| 2021/0203476 | A1* | 7/2021 | van de Ruit .......... H04L 9/0618 |

FOREIGN PATENT DOCUMENTS

| | | | | |
|---|---|---|---|---|
| CN | 106982205 | A | 7/2017 | |
| CN | 107294709 | A | 10/2017 | |
| CN | 103903129 | B | 11/2017 | |
| CN | 107360001 | A | 11/2017 | |
| CN | 107392603 | A | 11/2017 | |
| CN | 107666388 | A | 2/2018 | |
| CN | 107679976 | A | 2/2018 | |
| CN | 108009441 | A | 5/2018 | |
| CN | 108021821 | A * | 5/2018 | |
| CN | 108021821 | A | 5/2018 | |
| CN | 108111295 | A * | 6/2018 | ............. H04L 9/008 |
| CN | 108173805 | A * | 6/2018 | ........... G06F 21/602 |
| CN | 108173805 | A | 6/2018 | |
| CN | 108335106 | A | 7/2018 | |
| CN | 108418689 | A | 8/2018 | |
| CN | 108418783 | A | 8/2018 | |
| CN | 108711105 | A | 10/2018 | |
| CN | 108764874 | A | 11/2018 | |
| CN | 109034840 | A | 12/2018 | |
| CN | 106549749 | B | 12/2019 | |
| CN | 111833186 | A * | 10/2020 | |
| EP | 3576033 | A1 | 12/2019 | |
| JP | 2018-007168 | A | 1/2018 | |
| KR | 20180024994 | A | 3/2018 | |
| KR | 20180036922 | A | 4/2018 | |
| RU | 2663476 | C2 | 8/2018 | |
| TW | 201830302 | A | 8/2018 | |
| TW | I631518 | B | 8/2018 | |
| WO | 2012/067214 | A1 | 5/2012 | |
| WO | 2016200885 | A1 | 12/2016 | |
| WO | 2017011601 | A1 | 1/2017 | |
| WO | 2017054985 | A1 | 4/2017 | |
| WO | 2017095833 | A1 | 6/2017 | |
| WO | 2017218983 | A1 | 12/2017 | |
| WO | 2018022132 | A1 | 2/2018 | |
| WO | 2018076762 | A1 | 5/2018 | |
| WO | 2018/137316 | A1 | 8/2018 | |
| WO | 2018229631 | A1 | 12/2018 | |
| WO | 2018231397 | A1 | 12/2018 | |
| WO | 2019040855 | A1 | 2/2019 | |
| WO | 2019105407 | A1 | 6/2019 | |
| WO | WO-2019105407 | A1 * | 6/2019 | ........ G06Q 20/3825 |
| WO | WO-2019209168 | A2 * | 10/2019 | |
| WO | 2020033296 | A1 | 2/2020 | |

OTHER PUBLICATIONS

Search Report for Taiwanese Application No. 108110705 dated Jan. 17, 2020.
Search Report for Taiwanese Application No. 108110708 dated Jan. 31, 2020.
Search Report for European Application No. 18867008.7 dated Feb. 7, 2020.
Examination Report for European Application No. 18867008.7 dated Feb. 20, 2020.
Decision on Grant and Search Report for Russian Application No. 2019116029 dated Mar. 10, 2020.
Second Written Opinion for PCT Application No. PCT/US2019/045081 dated Mar. 18, 2020.
Supplementary Search Report for Chinese Application No. 201810886845.3 dated Mar. 23, 2020.
First Office Action for Chinese Application No. 201811003743.9 dated Feb. 3, 2020.

(56) References Cited

OTHER PUBLICATIONS

First Search Report for Chinese Application No. 201811003743.9 dated Jan. 19, 2020.
Second Office Action for Chinese Application No. 201811003743.9 dated Apr. 15, 2020.
Narula et al., "zkLedger: Privacy-Preserving Auditing for Distributed Ledgers", USENIX, Apr. 9, 2018.
Alonso et al., "Monero—Privacy in the Blockchain," IACR, May 31, 2018.
Poon et al., "The Bitcoin Lightning Network: Scalable Off-Chain Instant Payments," Jan. 14, 2016.
Preinterview first office action for U.S. Appl. No. 16/878,236 dated Jul. 22, 2020.
Bunz et al. ("Bulletproofs: Short Proof for Confidential Transactions and More", 45 pages, Jul. 1, 2018) (Year: 2018).
Second Examination Report for Australian Application No. 2018349940 dated May 22, 2020.
Office Action for Canadian Application No. 3044907 dated Jun. 4, 2020.
Final Office Action for U.S. Appl. No. 16/870,662 dated Nov. 25, 2020.
Office Action for Japanese Application No. 2019-528571 dated Sep. 8, 2020.
Yuki Yasusaka, et al., "A Privacy-preserving Pre-Consensus Protocol for Blockchain", Computer Security Symposium 2018 Proceedings, Information Processing Society of Japan, Oct. 15, 2018, pp. 850-856.
International Preliminary Report on Patentability for PCT Application No. PCT/US2019/045081 dated Oct. 16, 2020.
First Office Action and First Search for Chinese Application No. 201810886845.3 dated Jul. 31, 2019 and dated Jul. 23, 2019 (14 pages).
Written Opinion of the International Searching Authority and International Search Report for PCT Application No. PCT/CN2018/125749 dated Sep. 30, 2019 (6 pages).
Written Opinion of the International Searching Authority and International Search Report for PCT Application No. PCT/US2019/045081 dated Sep. 30, 2019 (16 pages).
Franca, "Homomorphic Mini-blockchain Scheme," Apr. 24, 2015, retrieved from: http://pdfs.semanticscholar.org/ab9f/b027061fb4aa8ed8017d63002f586a18eab6.pdf, retrieved on Sep. 20, 2019 (18 pages).
Sun et al., "RingCT 2.0: A Compact Accumulator-Based (Linkable Ring Signature) Protocol for Blockchain Cryptocurrency Monero," Aug. 12, 2017, International Conference on Computer Analysis of Images And Patterns, CAIP 2017: Computer Analysis of Images and Patterns, pp. 456-474 (20 pages).
Cecchetti et al., "Solidus: Confidential Distributed Ledger Transactions via PVORM," International Association For Cryptologic Research, Apr. 10, 2017 (28 pages).
Written Opinion of the International Searching Authority and International Search Report for PCT Application No. PCT/US2019/048667 dated Oct. 21, 2019 (13 pages).
Ma et al., "An Efficient NIZK Scheme for Privacy-Preserving Transactions over Account-Model Blockchain," IACR, International Association for Cryptologic Research, Dec. 22, 2017, retrieved from the internet: "http://eprint.iacr.org/2017/1239.pdf", retrieved on Dec. 22, 2017 (26 pages).
Preinterview first office action for U.S. Appl. No. 16/870,662 dated Jul. 24, 2020.
Written Opinion for Singaporean Application No. 11201904629U dated Jul. 27, 2020.
Non-Final Office Action for U.S. Appl. No. 16/870,662 dated Mar. 22, 2021.
Final Office Action for U.S. Appl. No. 16/878,236 dated Mar. 16, 2021.
Wang et al., "Preserving transaction privacy in bitcoin, Future Generation Computer Systems," ScienceDirect, 2017.
Notice of Allowance for U.S. Appl. No. 16/870,662 dated Dec. 10, 2021.
Liubin "Online Dispute Resolution in Russia and Europe—Current Situation and Prospects of Development", Jun. 7 and Jun. 8, 2018, Economic and Social Development: Book of Proceedings: 197-203, Nov. 17, 2021.
Non-Final Office Action for U.S. Appl. No. 16/879,728 dated Dec. 9, 2021.
Final Office Action for U.S. Appl. No. 16/870,662 dated Aug. 3, 2021.
Notice of Allowance for U.S. Appl. No. 16/878,236 dated Dec. 20, 2021.
Kuribayashi et al., "Secure Data Management System with Traceability against Internal Leakage," https://ieeexplore.ieee.org/stamp/stamp.jsp?tp=&arnumber=8282268, Dec. 12-15, 2017.
Non-Final Office Action for U.S. Appl. No. 16/879,728 dated Feb. 2, 2021.
Non-Final Office Action for U.S. Appl. No. 16/531,476 dated May 10, 2021.
Non-Final Office Action for U.S. Appl. No. 16/879,728 dated May 24, 2021.
Second Office Action for Chinese Application No. 201810886845.3 dated Dec. 10, 2019 with English machine translation (15 pages).
Supplementary Search for Chinese Application No. 201810886845.3 dated Dec. 2, 2019 (1 page).
Rectinajh, "Ethernet Square white book", Jianshu, retrieved from: https://www.jianshu.com/p/a4e32c50262a, Jan. 18, 2018, with English machine translation (52 pages).
First Examination Report for Australian Application No. 2018349940 dated Dec. 18, 2019 (4 pages).

\* cited by examiner

Determining a transaction amount to be remitted from a blockchain account of a remitter into a blockchain account of a receiver, wherein the blockchain account of the remitter records a homomorphic encryption ciphertext of the remitter's balance in a blockchain, and the blockchain account of the receiver records a homomorphic encryption ciphertext of the receiver's balance in the blockchain ~ 102

Generating a homomorphic encryption ciphertext of the transaction amount with respect to the remitter and a homomorphic encryption ciphertext of the transaction amount with respect to the receiver ~ 104

Submitting to the blockchain a transaction comprising information of the blockchain account of the remitter, information of the blockchain account of the receiver, the homomorphic encryption ciphertext of the transaction amount with respect to the remitter and the homomorphic encryption ciphertext of the transaction amount with respect to the receiver, for the homomorphic encryption ciphertext of the transaction amount with respect to the remitter to be subtracted from the homomorphic encryption ciphertext of the remitter's balance and for the homomorphic encryption ciphertext of the transaction amount with respect to the receiver to be added to the homomorphic encryption ciphertext of the receiver's balance ~ 106

METHOD, APPARATUS AND ELECTRONIC DEVICE FOR BLOCKCHAIN TRANSACTIONS

CROSS REFERENCE TO RELATED APPLICATION

The present application is based on and claims priority to Chinese Patent Application No. 201811003743.9, filed on Aug. 30, 2018, which is incorporated herein by reference in its entirety.

TECHNICAL FIELD

One or more of embodiments of the application are related to the technical field of blockchain, particularly to a method, apparatus, and electronic device for implementing blockchain-based transactions.

BACKGROUND

Blockchain nodes of a blockchain network may jointly maintain unified blockchain ledgers through a consensus reached among the blockchain nodes, to record data of transactions. The blockchain ledgers can be made public for viewing and verification of the historical data of the transactions at any time. Therefore, current blockchain ledgers practically have no privacy protection.

SUMMARY

One or more of embodiments of the specification provide a method for implementing blockchain-based transactions. The method may comprise: determining a transaction amount to be remitted from a blockchain account of a remitter into a blockchain account of a receiver, wherein the blockchain account of the remitter records a homomorphic encryption ciphertext of the remitter's balance in a blockchain, and the blockchain account of the receiver records a homomorphic encryption ciphertext of the receiver's balance in the blockchain; generating a homomorphic encryption ciphertext of the transaction amount with respect to the remitter and a homomorphic encryption ciphertext of the transaction amount with respect to the receiver; and submitting to the blockchain a transaction comprising information of the blockchain account of the remitter, information of the blockchain account of the receiver, the homomorphic encryption ciphertext of the transaction amount with respect to the remitter and the homomorphic encryption ciphertext of the transaction amount with respect to the receiver, for the homomorphic encryption ciphertext of the transaction amount with respect to the remitter to be subtracted from the homomorphic encryption ciphertext of the remitter's balance and for the homomorphic encryption ciphertext of the transaction amount with respect to the receiver to be added to the homomorphic encryption ciphertext of the receiver's balance.

In some embodiments, the homomorphic encryption ciphertext of the remitter's balance is a commitment of the remitter's balance, and the homomorphic encryption ciphertext of the receiver's balance is a commitment of the receiver's balance.

In some embodiments, the homomorphic encryption ciphertext of the remitter's balance is a Pedersen Commitment of the remitter's balance, and the homomorphic encryption ciphertext of the receiver's balance is a Pedersen Commitment of the remitter's balance.

In some embodiments, the homomorphic encryption ciphertext of the remitter's balance is obtained by applying a homomorphic encryption algorithm to the remitter's balance based on a public key of the remitter and a remitter random number, and the homomorphic encryption ciphertext of the receiver's balance is obtained by applying a homomorphic encryption algorithm to the receiver's balance based on a public key of the receiver and a receiver random number.

In some embodiments, the method further comprises: generating a range proof related to the remitter's balance and the transaction amount with respect to the remitter; and adding the range proof to the transaction for the one or more blockchain nodes in the blockchain to verify whether the transaction amount is no greater than the remitter's balance.

In some embodiments, the homomorphic encryption ciphertext of the transaction amount with respect to the remitter is a commitment of the transaction amount with respect to the remitter based on the public key of the remitter, and the homomorphic encryption ciphertext of the transaction amount with respect to the receiver is a commitment of the transaction amount with respect to the receiver based on the public key of the receiver.

In some embodiments, the method further comprises: applying a homomorphic encryption algorithm to generate the commitment of the transaction amount with respect to the remitter based on a transaction amount random number with respect to the remitter, the transaction amount, and the public key of the remitter; and applying the homomorphic encryption algorithm to generate the commitment of the transaction amount with respect to the receiver based on a transaction amount random number with respect to the receiver, the transaction amount, and the public key of the receiver.

In some embodiments, the method further comprises: determining a difference between the transaction amount random number with respect to the remitter and the transaction amount random number with respect to the receiver; and adding the difference between the transaction amount random number with respect to the remitter and the transaction amount random number with respect to the receiver in the transaction, for one or more blockchain nodes in the blockchain to verify that the commitment of the transaction amount with respect to the remitter is equal to the commitment of the transaction amount with respect to the receiver.

In some embodiments, the method is implementable by a first computing device associated with the remitter, and the method further comprises: sending the transaction amount random number with respect to the receiver to a second computing device associated with the receiver via an off-chain channel.

In some embodiments, the method further comprises: generating a public key proof associated with the receiver according to a homomorphic encryption algorithm and the homomorphic encryption ciphertext of the transaction amount with respect to the receiver; and adding the public key proof associated with the receiver in the transaction, for one or more blockchain nodes in the blockchain to verify that the homomorphic encryption ciphertext of the transaction amount with respect to the receiver and the homomorphic encryption ciphertext of the receiver's balance are both encrypted based on the public key of the receiver.

In some embodiments, wherein generating a public key proof associated with the receiver according to a homomorphic encryption algorithm and the homomorphic encryption ciphertext of the transaction amount with respect to the receiver comprises: generating a first verification random number and a second verification random number; applying the homomorphic encryption algorithm to generate a random-number homomorphic encryption ciphertext based on the first verification random number, the second verification random number, and the public key of the receiver; obtaining a hash digest by conducting a hash operation on the homomorphic encryption ciphertext of the transaction amount with respect to the receiver and the random-number homomorphic encryption ciphertext; and generating a first verification element associated with the first verification random number and a second verification element associated with the second verification random number according to the hash digest.

In some embodiments, the method further comprises: generating a digital signature of the remitter endorsing the homomorphic encryption ciphertext of the transaction amount with respect to the remitter and the homomorphic encryption ciphertext of the transaction amount with respect to the receiver based on a private key of the remitter; and adding the digital signature of the remitter to the transaction for one or more blockchain nodes in the blockchain to verify the digital signature of the remitter.

One or more embodiments of the specification also provide an apparatus for implementing blockchain-based transactions. The apparatus comprises one or more processors and one or more non-transitory computer-readable memories coupled to the one or more processors and configured with instructions executable by the one or more processors to cause the apparatus to perform operations comprising: determining a transaction amount to be remitted from a blockchain account of a remitter into a blockchain account of a receiver, wherein the blockchain account of the remitter records a homomorphic encryption ciphertext of the remitter's balance in a blockchain, and the blockchain account of the receiver records a homomorphic encryption ciphertext of the receiver's balance in the blockchain; generating a homomorphic encryption ciphertext of the transaction amount with respect to the remitter and a homomorphic encryption ciphertext of the transaction amount with respect to the receiver; and submitting to the blockchain a transaction comprising information of the blockchain account of the remitter, information of the blockchain account of the receiver, the homomorphic encryption ciphertext of the transaction amount with respect to the remitter and the homomorphic encryption ciphertext of the transaction amount with respect to the receiver, for the homomorphic encryption ciphertext of the transaction amount with respect to the remitter to be subtracted from the homomorphic encryption ciphertext of the remitter's balance and for the homomorphic encryption ciphertext of the transaction amount with respect to the receiver to be added to the homomorphic encryption ciphertext of the receiver's balance.

One or more embodiments of the specification further provide a non-transitory computer-readable storage medium configured with instructions executable by one or more processors to cause the one or more processors to perform operations comprising: determining a transaction amount to be remitted from a blockchain account of a remitter into a blockchain account of a receiver, wherein the blockchain account of the remitter records a homomorphic encryption ciphertext of the remitter's balance in a blockchain, and the blockchain account of the receiver records a homomorphic encryption ciphertext of the receiver's balance in the blockchain; generating a homomorphic encryption ciphertext of the transaction amount with respect to the remitter and a homomorphic encryption ciphertext of the transaction amount with respect to the receiver; and submitting to the blockchain a transaction comprising information of the blockchain account of the remitter, information of the blockchain account of the receiver, the homomorphic encryption ciphertext of the transaction amount with respect to the remitter and the homomorphic encryption ciphertext of the transaction amount with respect to the receiver, for the homomorphic encryption ciphertext of the transaction amount with respect to the remitter to be subtracted from the homomorphic encryption ciphertext of the remitter's balance and for the homomorphic encryption ciphertext of the transaction amount with respect to the receiver to be added to the homomorphic encryption ciphertext of the receiver's balance.

The method, apparatus, and computing device for implementing blockchain-based transactions described in the application provide a non-interactive transfer which allows a remitter to transfer money or assets to a receiver without the participation of the receiver, while protecting privacies such as account balances and transaction amounts. Through the embodiments described in the application, the balance of an account is visible to the owner of the account and may be hidden from other users. The transaction amount is visible to the remitter and the receiver (also referred to as a remittee) of a transaction and may be hidden from other users. Blockchain nodes can verify the validity of the transaction based on the encrypted transaction amount and update the account balances of the remitter and the remittee according to the verified transaction. The non-interactive transaction method, apparatus, and computing device have the following advantages: transactions may be initiated by a remitter without relying on a receiver's input or a network transmission of the receiver, and therefore can protect transaction execution from interferences, such as disconnection of the receiver, a delay in response, network failure and latency, etc.

DETAILED DESCRIPTION

Embodiments will be described in detail, with examples shown in the accompanying drawings. When the description below involves the accompanying drawings, unless otherwise indicated, the same numeral in different accompanying drawings stands for the same element or similar elements. The implementation manners described in the following embodiments do not represent all the implementation manners consistent with the present specification. Rather, they are mere examples of the apparatuses and methods described in detail in the attached claims and consistent with some aspects of one or more embodiments of the present specification.

In some embodiments, it is not necessary to perform steps in the methods according to the sequence illustrated and described in the present specification. In some other embodiments, the steps of the methods may be more or fewer than those described in the present specification. Further, a single step described in the present specification may be split into multiple steps for description in other embodiments, while multiple steps described in the present specification may be merged into one single step for description in yet other embodiments.

A blockchain described in the embodiments may refer to a computer network system of blockchain nodes based on a consensus mechanism and a distributed data storage structure. The data in the blockchain is stored in multiple temporally connected "blocks," with one block containing a data digest of the preceding block in a chain. The consensus mechanism may comprise, for example, Proof of Work (PoW), Proof of Stake (PoS), Delegated Proof of Stake (DPOS), or Practical Byzantine Fault Tolerance (PBFT). Since blockchain systems operate under a corresponding consensus mechanism, the data recorded in the blockchain's database cannot be easily tampered with by individual blockchain nodes. Thus, the consensus mechanism may ensure a unified version of the stored data. In some embodiments, the data recorded in the distributed databases of the blockchain cannot be tampered with, thereby achieving persistent storage of blockchain-based transactions.

Figure 1:
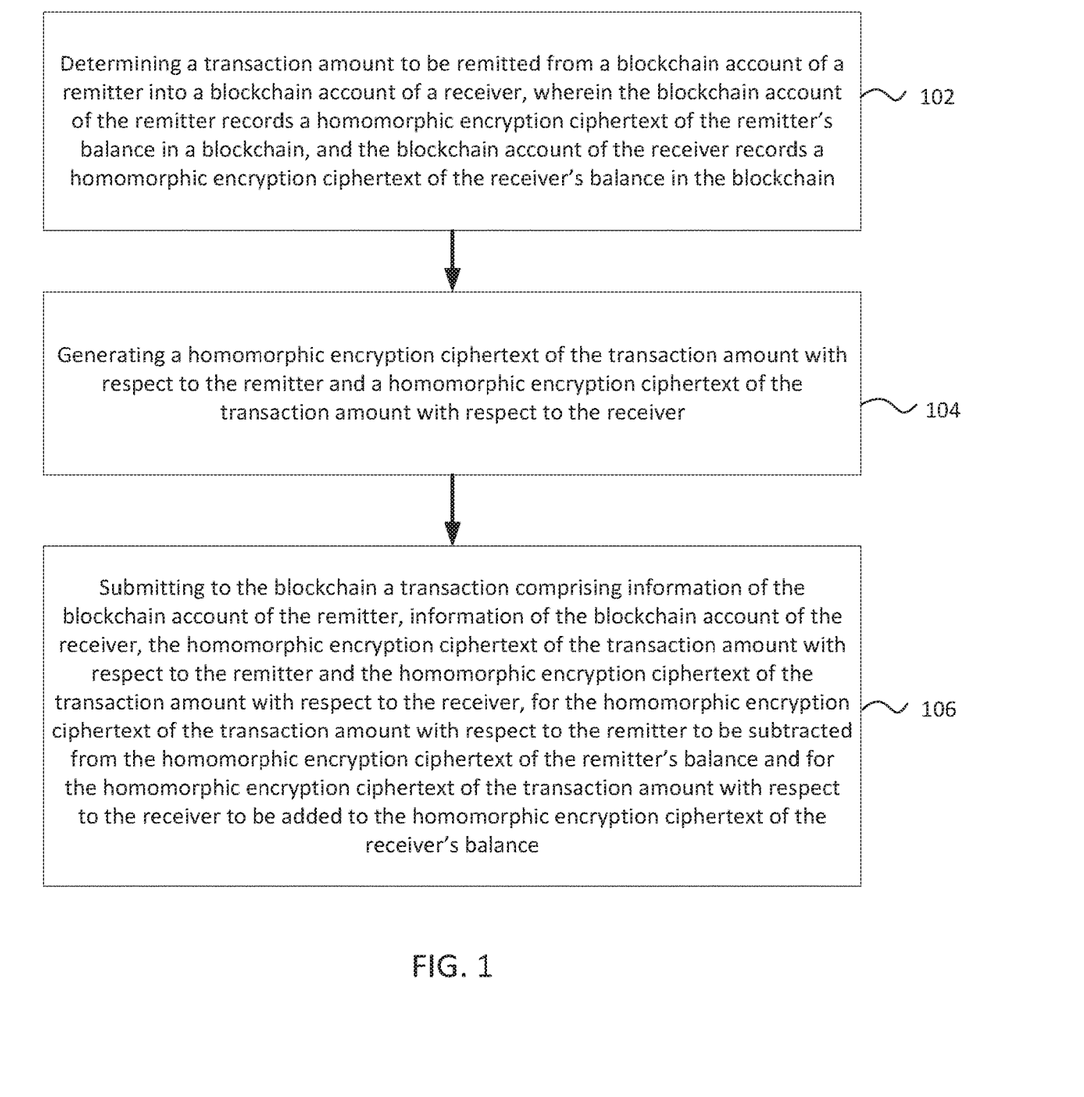
FIG. 1 is a flowchart of a method for implementing blockchain-based transactions according to some embodiments of the specification.

FIG. 1 is a flowchart of a method for implementing blockchain-based transactions according to some embodiments of the specification. As shown in FIG. 1, the method is implementable by a computing device associated with a remitter (also referred to as a remitter device) and may comprise the following steps 102-106.

Step 102, determining a transaction amount to be remitted from a blockchain account of a remitter into a blockchain account of a receiver, wherein the blockchain account of the remitter records a homomorphic encryption ciphertext of the remitter's balance in a blockchain, and the blockchain account of the receiver records a homomorphic encryption ciphertext of the receiver's balance in the blockchain.

In some embodiments, one or more remitter users (also referred to as remitters) may negotiate with one or more receiver users (also referred to as receivers) to determine a transaction amount of a transaction (e.g., a financial transaction). The transaction may be executed in a blockchain network maintaining a blockchain and recorded in the blockchain. Thus, the transaction may be blockchain-based. A remitter and receiver may refer to an individual or entity participating the blockchain-based transaction. For example, a remitter may be an individual or entity remitting money to a receiver through a transaction. A receiver may be an individual or entity receiving money from a remitter through the transaction. The remitter may be associated with remitter devices and the receiver may be associated with receiver devices. For example, the remitter devices and receiver devices may be computing devices such as a personal computer, a laptop computer, a cell phone, a camera phone, a smart phone, a PDA (personal digital assistant), a media player, a navigation device, an email sending and receiving device, a game console, a tablet computer, a wearable device, or any combination thereof. For convenience and conciseness, a remitter or receiver described in the specification may also refer to a computing device associated with the human or entity remitter or receiver, respectively.

A blockchain-based transaction of the application can be achieved between a remitter device associated with a remitter and a receiver device associated with a receiver by remitting (or transferring) an asset certificate representing the transaction amount to be remitted from the remitter's blockchain account to the receiver's blockchain account. The asset certificate may be associated with a token, a digital asset, or any other intelligent asset in a blockchain. Alternatively, the asset certificate may also represent cash, security, discount coupon, real estate or any other off-chain asset.

In some embodiments, the homomorphic encryption ciphertext of the remitter's balance described in the foregoing embodiments may be a commitment of the remitter's balance, and may be calculated by applying a homomorphic encryption algorithm to the remitter's balance based on a public key of the remitter (also referred to as the remitter's public key) and a remitter random number. Similarly, the homomorphic encryption ciphertext of the receiver's balance described in the foregoing embodiments may be a commitment of the receiver's balance, and may be calculated by applying a homomorphic encryption algorithm to the receiver's balance based on a public key of the receiver (also referred to as the receiver's public key) and a receiver random number. The blockchain nodes in a blockchain may respectively maintain unified blockchain ledgers based on a consensus. Therefore, by recording the ciphertext of the remitter's balance and the ciphertext of the receiver's balance in the blockchain, the blockchain ledgers maintained by the blockchain nodes may not need to record the remitter's balance and the receiver's balance. As a result, the blockchain balances held by remitter users and the blockchain balances held by receiver users are concealed as private data. Thus, evidence of the account balances of the remitters and the receivers can be stored in the blockchain without storing the account balances themselves. Further, the evidence of the account balances is difficult to be tampered with, thereby protecting the privacy of the blockchain accounts.

There are no restrictions on the methods for recording the ciphertext of the remitter's balance or the ciphertext of the receiver's balance in the blockchain. The ciphertext of the remitter's balance or the ciphertext of the receiver's balance may be published in the blockchain in the form of blockchain-based transactions, or recorded in the account attributes of the remitter account or the receiver account, or in any other forms that a person of ordinary skill in the art can come up with without creative efforts.

In some embodiments, a random number may be generated according to the homomorphic encryption algorithm, so that the random number and unencrypted data are collectively converted into corresponding ciphertext data (such as a commitment). Accordingly, corresponding decrypted data may be obtained by acquiring the random number to decrypt the ciphertext data. In addition, it may be verified whether the ciphertext data corresponds to the unencrypted data based on the random number. For example, the homomorphic encryption algorithm may be a Pedersen Commitment (PC) mechanism. The ciphertext data may be a Pedersen Commitment.

For example, the homomorphic encryption algorithm involving Pedersen Commitment (PC) is used to encrypt the remitter's account balance t. The common parameters (G, H) are two generators of an elliptic curve, and the remitter has a pair of public and private keys (Pk, Sk) based on the elliptic curve, where Pk=SkG; the commitment of the remitter's balance t is (T, T')=(rG+tH, rPk), where rG+tH is Pedersen Commitment, and r is a random number used in the homomorphic encryption. Since the part containing the random number r, i.e., rG, can be eliminated when the remitter uses the private key Sk for decryption to inspect its account balance, the random number r does not have to be recorded. In decrypting (T, T')=(rG+tH, rPk), the key Sk may be used to obtain rG=T'Sk$^{-1}$ from T'=rPk=rSkG, thereby eliminating the part containing a random number r, i.e., rG, to obtain tH=T−rG. In addition, in order to decrypt the ciphertext tH of the remitter's account balance amount t, the following setting is implemented, i.e., the amount t has a range of validity, for example, [0, $2^{32}$]. Many methods are available for decrypting the ciphertext tH of amount t, for example, Pollard's Kangaroo method. Alternatively, a corresponding ciphertext set of the range is calculated and stored in advance, and the value of t can be determined by looking up in a table according to the value of tH.

Similarly, the ciphertext of the receiver's balance may be generated by applying the same homomorphic encryption algorithm as that used for generating the ciphertext of the remitter's balance. For example, the commitment of the receiver's balance may be generated by using the generators G, H of the same elliptic curve and based on a public key of the receiver (also referred to as the receiver's public key) and the receiver's account balance, so that the receiver's balance can be obtained by decrypting the commitment of the receiver's balance by using the receiver's private key, thereby protecting the privacy of the user accounts in the blockchain.

Step 104, generating a homomorphic encryption ciphertext of the transaction amount with respect to the remitter and a homomorphic encryption ciphertext of the transaction amount with respect to the receiver.

In some embodiments, the homomorphic encryption ciphertext of the transaction amount with respect to the remitter is a commitment of the transaction amount with respect to the remitter based on the public key of the remitter, and the homomorphic encryption ciphertext of the transaction amount with respect to the receiver is a commitment of the transaction amount with respect to the receiver based on the public key of the receiver.

In some embodiments, the same homomorphic encryption algorithm may be used for the commitment of the transaction amount with respect to the remitter and the commitment of the remitter's balance, as well as for the commitment of the transaction amount with respect to the receiver and the commitment of the receiver's balance. Therefore, the commitment of the transaction amount with respect to the remitter can be subtracted from the commitment of the remitter's balance, and the commitment of the transaction amount with respect to the receiver can be subtracted from the commitment of the receiver's balance.

In some embodiments, the commitment of the transaction amount with respect to the remitter is calculated by applying a homomorphic encryption algorithm (such as the homomorphic encryption algorithm described above) according to a transaction amount random number with respect to the remitter, r_A, the transaction amount t_A, and the remitter's public key Pk_A. For example, the commitment of the transaction amount with respect to the remitter is (T_A, T'A, T_A)=(r_AG+t_AH, r_APk_A). Similarly, the commitment of the transaction amount with respect to the receiver is calculated by applying the homomorphic encryption algorithm according to a transaction amount random number with respect to the receiver, r_B, the transaction amount t_B, and the receiver's public key Pk_B. For example, the commitment ciphertext of the transaction amount with respect to the receiver is (T_B, T'_B)=(r_BG+t_BH, r_BPk_B), where t_A=t_B. In addition, in order to enable the receiver to generate a range proof for a new transaction based on an updated account balance after receiving the transaction amount, the receiver may need to obtain the value of r_B. In order to prevent the other nodes in the blockchain from learning the value of r_B to decrypt the transaction amount, the remitter may send r_B in the transaction to the receiver via an off-chain channel. Such an action does not affect the ongoing transaction, so the random number r_B can be sent after the transaction is submitted by the remitter and implemented in the blockchain. The random number r_B can be sent via an email or other ways agreed with by the receiver in advance.

Since both the commitment of the transaction amount sent by the remitter and the commitment of the transaction amount with respect to the receiver are ciphertexts, the other nodes can learn neither the value of the transaction amount remitted by the remitter t_A, nor whether the amount t_A sent by the remitter is the same as the amount t_B received by the receiver. The receiver can know the value of t_B by decrypting the receiver's transaction commitment sent by the remitter based on the private key of the receiver. Further, in some embodiments of the application, the remitter may publish the difference between the random number r_A and the random number r_B in the blockchain, so that the blockchain nodes in the blockchain can verify whether the value of rG is equal to the value of T_A−T_B. If they are equal, it proves that t_A=t_B.

The foregoing contains a scenario where r=r_A=r_B, and t, t_A, and t_B are used to calculate the commitment of the transaction amount with respect to the remitter (T_A, T'_A)=(rG+tH, rPk_A) and the commitment of the transaction amount with respect to the receiver (T_B, T'_B)=(rG+tH, rPk_B). In such a scenario, the transaction amount does not have to be categorized as the remitter's transaction amount and the receiver's transaction amount, and the corresponding commitments may be merged as one, e.g., (rG+tH, rPk_A, rPk_B). For such a scenario, the following technical details may be simplified.

In some embodiments, the ciphertext of the transaction amount with respect to the remitter is calculated by the homomorphic encryption algorithm according to the transaction amount and the remitter's public key, and the ciphertext of the transaction amount with respect to the receiver is calculated by the homomorphic encryption algorithm according to the transaction amount and the receiver's public key. Therefore, the other nodes in the blockchain (such as blockchain nodes other than those associated with the remitter and the receiver) may not know from the ciphertext of the transaction amount with respect to the receiver whether the ciphertext of the transaction amount with respect to the receiver is based on the receiver's public key (or whether it is the same as the public key used in the ciphertext of the receiver's balance), not to mention whether the ciphertext of the transaction amount with respect to the receiver can be decrypted with the receiver's private key to obtain the transaction amount. In order to help the other nodes verify the ciphertext of the transaction amount with respect to the receiver released by the remitter and prevent transaction fraud potentially committed by the remitter, the remitter may also send a public key proof associated with the receiver to the blockchain, so that the blockchain nodes in the blockchain can verify that the ciphertext of the transaction amount with respect to the receiver and the ciphertext of the receiver's balance are calculated by the homomorphic encryption algorithm based on the same public key. In some embodiments, the public key proof associated with the receiver is generated based on the homomorphic encryption algorithm and the ciphertext of the transaction amount with respect to the receiver.

In some embodiments, the remitter generates the public key proof Pf in the following manner, to prove that the commitment of the transaction amount with respect to the receiver $(T\_B, T'\_B)=(r\_BG+t\_BH, r\_BPk\_B)$ is encrypted with the public key Pk_B of the receiver: generating a pair of random numbers (r', t'), where r' is a first verification random number and t' is a second verification random number, and calculating the random number commitment $(T, T')=(r' G+t' H, r' Pk\_B)$ by using the same homomorphic encryption algorithm used in generating a commitment of the transaction amount with respect to the receiver, where Pk_B is the public key used in the commitment of the receiver's balance; calculating a hash u=Hash(T_B, T'_B, T, T') and v=u r_B+r', w=u t_B+t', where Hash represents a hash operation (such as an operation based on a hash function which returns a hash digest), v is a first verification element corresponding to the first verification random number r', and w is a second verification element corresponding to the second verification random number t'; and generating Pf=(T, T'; v, w).

In verifying whether the public key used in the commitment of the transaction amount with respect to the receiver sent by the remitter is the same as the public key used in the commitment of the receiver's balance, the other nodes in the blockchain acquire the foregoing Pf=(T, T'; v, w) to verify whether $(vG+wH, v Pk\_B)=(uT\_B+T, uT'\_B+T')$ is correct.

If correct, it indicates that the commitment of the transaction amount with respect to the receiver and the commitment of the receiver's balance are calculated by the homomorphic encryption algorithm based on the same public key, and the commitment of the transaction amount with respect to the receiver can be decrypted with a private key corresponding to the foregoing public key to obtain the transaction amount. If not correct, the transaction may be rejected. There may be serious consequences if not rejecting such transaction. For example, the remitter may have encrypted the transaction amount with the public key which is not the receiver's public key, to generate the commitment of the transaction amount with respect to the receiver, or have used a number to falsify the foregoing commitment of the transaction amount with respect to the receiver. In this case, if the commitment of the transaction amount with respect to the receiver is updated to the commitment of the receiver's balance, the receiver cannot decrypt the commitment of his or her balance and cannot remit assets from his or her account, and the receiver's account can be impaired.

The implementation manner of the foregoing public key proof associated with the receiver can prevent accounts from being impaired, without requiring the remittee's participation, which is therefore a non-interactive way.

As described in the foregoing embodiments, the commitment of the remitter's balance is calculated by the homomorphic encryption algorithm based on the remitter random number, the remitter's balance, and the remitter's public key. The commitment of the remitter's balance is $(S\_A, S'\_A)=(r'\_A G+s\_A H, r'\_A Pk\_A)$, where s_A is the remitter's balance. The commitment of the transaction amount with respect to the remitter is calculated by the homomorphic encryption algorithm according to the transaction amount random number with respect to the remitter, the transaction amount and the remitter's public key, i.e., the commitment of the transaction amount with respect to the remitter is $(T\_A, T'\_A)=(r\_AG+t\_AH, r\_APk\_A)$, where t_A is the transaction amount. A remitter device may generate a range proof according to the remitter random number r'_A, the remitter's balance s_A, the commitment of the remitter's balance (S_A, S'_A), the transaction amount random number with respect to the remitter r_A, the transaction amount t_A, and the commitment of the transaction amount with respect to the remitter (T_A, T'_A). For instance, range proof technologies such as a Bulletproofs method or a Borromean ring signature method in related technologies may be used. The remitter device may add the range proof in the transaction, so that the blockchain nodes in the blockchain can verify whether the transaction amount t_A is no smaller than zero and no greater than the remitter's balance s_A.

A digital signature may provide validation or authentication of the data that the digital signature is signed against. A digital signature may be achieved by asymmetric cryptography. In some embodiments, a remitter device may generate a digital signature endorsing the ciphertext of the transaction amount with respect to the remitter and the ciphertext of the transaction amount with respect to the receiver via a private key of the remitter, and add the digital signature to the transaction. The remitter device may submit the transaction to the blockchain so that the blockchain nodes in the blockchain can verify the digital signature. In some embodiments, the remitter's digital signature may also endorse the data that has been signed against, such as a difference between the transaction amount random number with respect to the remitter and a transaction amount random number with respect to the receiver, the public key proof associated with the receiver, and/or the range proof. When a transaction does not contain this remitter's digital signature, the blockchain nodes may determine that consensus fails and refuse to proceed with this transaction.

Step 106, submitting to the blockchain a transaction comprising information of the blockchain account of the remitter, information of the blockchain account of the receiver, the homomorphic encryption ciphertext of the transaction amount with respect to the remitter and the homomorphic encryption ciphertext of the transaction amount with respect to the receiver, for the homomorphic encryption ciphertext of the transaction amount with respect to the remitter to be subtracted from the homomorphic encryption ciphertext of the remitter's balance and for the homomorphic encryption ciphertext of the transaction amount with respect to the receiver to be added to the homomorphic encryption ciphertext of the receiver's balance.

For example, the subtraction and addition in Step 106 may be implemented according to the following equations:

$$(S\_A, S'\_A)-(T\_A, T'\_A)=(S\_A-T\_A, S'\_A-T'\_A),$$

$$(S\_B, S'\_B)+(T\_B, T'\_B)=(S\_B+T\_B, S'\_B+T'\_B).$$

That is, subtracting the commitment of the transaction amount with respect to the remitter (T_A, T'_A) from the commitment of the remitter's balance (S_A, S'_A) equals to the commitment of the result of subtracting the transaction amount with respect to the remitter from the remitter's balance; similarly, adding the commitment of the transaction amount with respect to the receiver to the commitment of the receiver's balance equals to the commitment of the sum of the transaction amount with respect to the receiver and the receiver's balance.

In the foregoing embodiments, the ciphertext of the transaction amount with respect to the remitter and the ciphertext of the transaction amount with respect to the receiver are used in a transaction, so that the blockchain ledgers may record the transaction ciphertexts, and may not record the corresponding transaction amount, thereby concealing the transaction amount. In addition, the ciphertext of the remitter's balance corresponding to a remitter's balance, a ciphertext of the receiver's balance corresponding to a receiver's balance, and a ciphertext of the transaction amount with respect to the remitter and a ciphertext of the transaction amount with respect to the receiver corresponding to a transaction amount are generated by the same homomorphic encryption algorithm. Accordingly, the other blockchain nodes may subtract the ciphertext of the transaction amount with respect to the remitter from the ciphertext of the remitter's balance, and add the ciphertext of the receiver's balance and the receiver's transaction ciphertext, without the need to acquire the remitter's balance, the receiver's balance and the transaction amount, so as to ensure protection of the private data.

In some embodiments, after the blockchain nodes receive the foregoing transaction, the blockchain nodes may use double-spending prevention mechanism or replay attack prevention mechanism to verify if the transaction has been executed. If the transaction has been executed, the transaction may be rejected.

Figure 2:
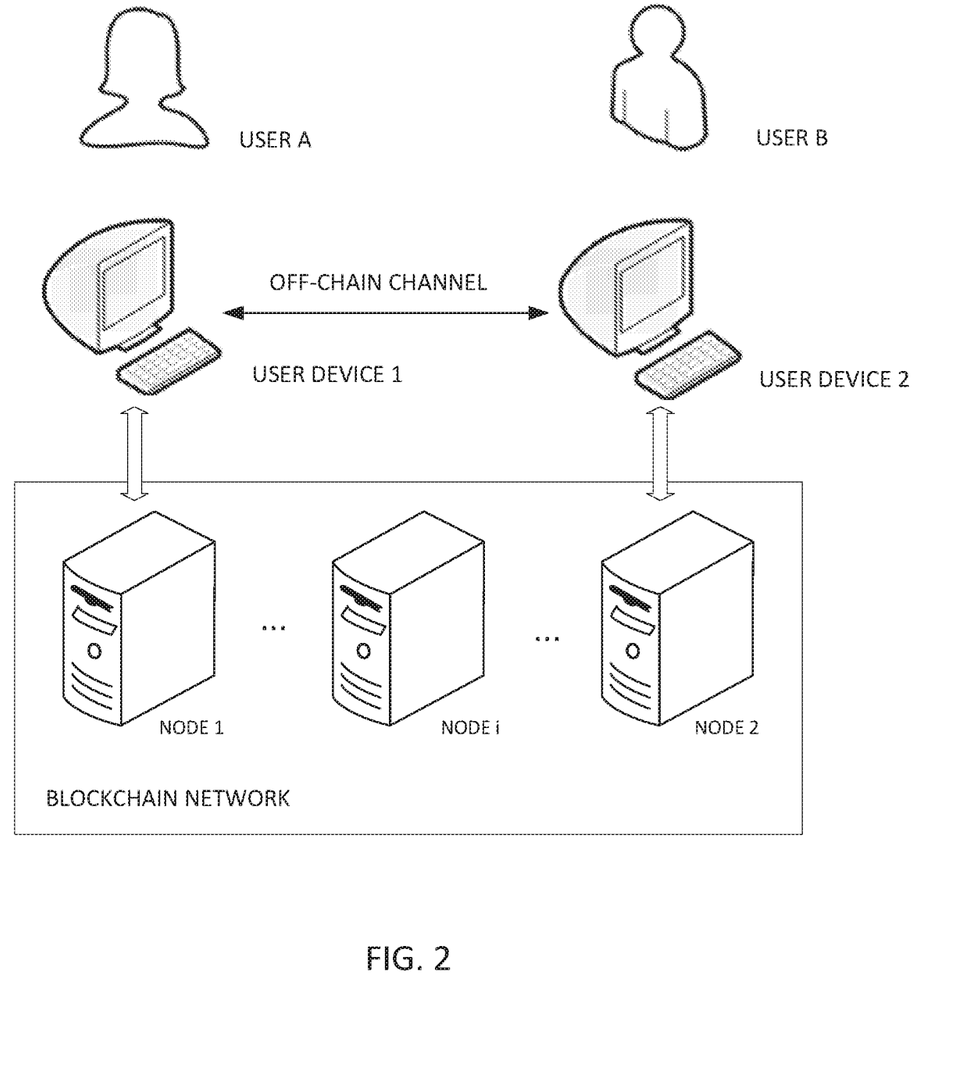
FIG. 2 is a schematic diagram of a method for implementing a remittance transaction in a blockchain network according to some embodiments of the specification.

In some embodiments, a remittance transaction in a blockchain network is taken below as an example to describe the application in detail. FIG. 2 is a schematic diagram of implementing a remittance transaction in a blockchain network according to some embodiments of the specification. As shown in FIG. 2, assuming that a user A remits to a user B in a blockchain. A "user" in the application may be manifested as a signed-in user account, while the user account may belong to an individual or an organization.

It is assumed that a remitter device used by the user A is a user device 1, for example, a user account associated with the user A is logged in on the user device 1. Similarly, a receiver device used by the user B is a user device 2. A client program of blockchain may be run on the user device 1, so that the user device 1 runs a corresponding blockchain node in the blockchain network, e.g., a node 1 shown in FIG. 2. Similarly, a client program of blockchain may be run on the user device 2 so that the user device 2 runs a corresponding blockchain node in the blockchain network, e.g., a node 2 shown in FIG. 2. The blockchain network also has other blockchain nodes, such as node i shown in FIG. 2, which will not be enumerated herein. Through the foregoing node 1, node 2, etc., the remittance transaction between the user A and the user B may be implemented via the blockchain network, and related transaction information may be recorded to the blockchain ledgers maintained by blockchain nodes respectively, thereby preventing the recorded transaction information from being tampered with, and also facilitating subsequent inspection.

Figure 3:
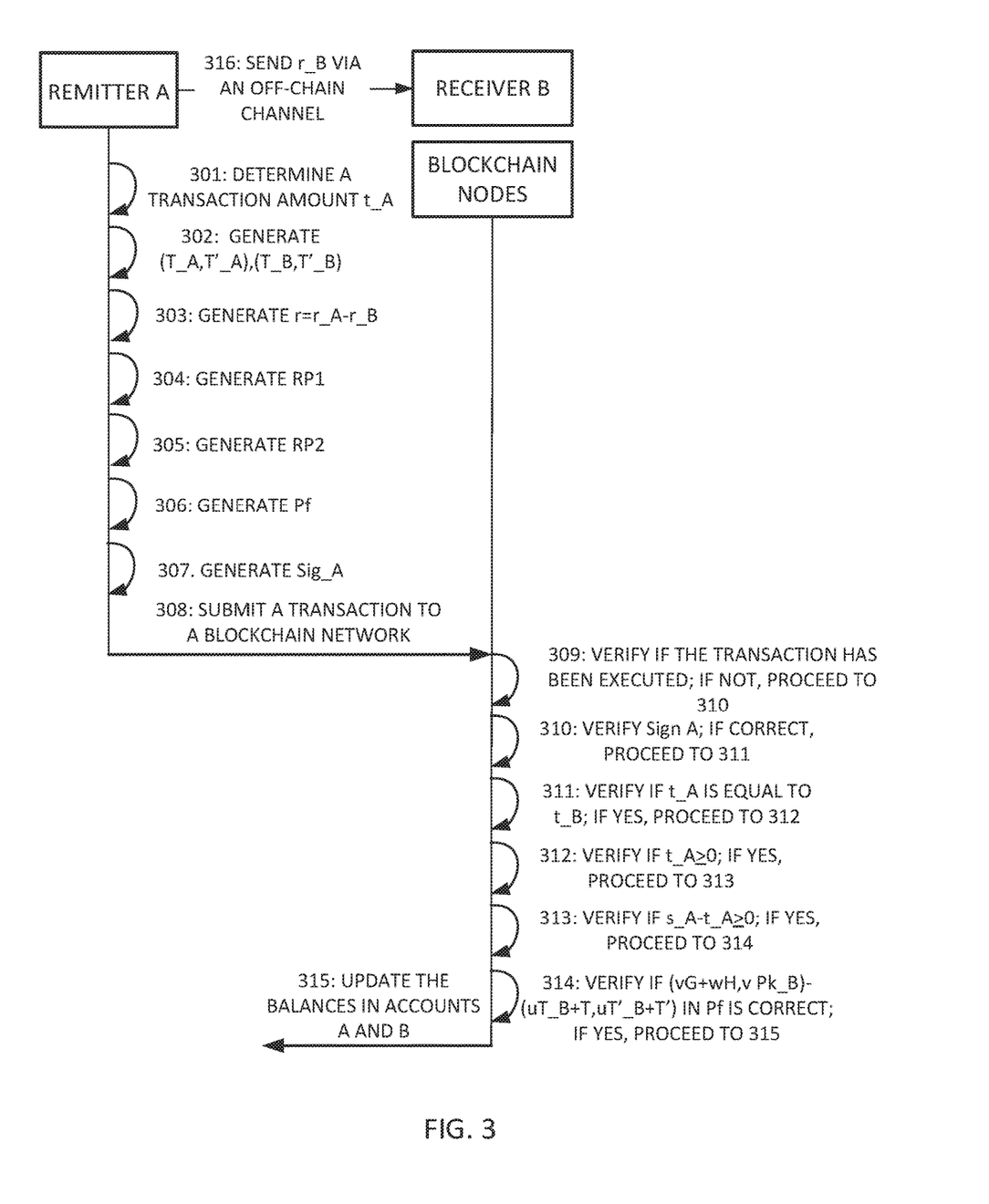
FIG. 3 is a flowchart of a method for implementing a remittance transaction in a blockchain network according to some embodiments of the specification.

With respect to the scenario of the remittance transaction shown in FIG. 2, FIG. 3 is a flowchart of implementing a remittance transaction in a blockchain network according to some embodiments of the specification. As shown in FIG. 3, the process of interaction among the remitter and blockchain nodes may comprise the following steps 301-316.

Step 301, determining a transaction amount t_A to be remitted from a remitter's blockchain account into a receiver's blockchain account.

In some embodiments, a remitter refers to the individual or entity that remits a fund and other resources in a remittance transaction, and correspondingly a receiver refers to the individual or entity that receives the fund and other resources in the remittance transaction. For example, in the embodiments shown in FIG. 2, the user device 1 may be configured as the remitter, while the user device 2 may be configured as the receiver.

The commitment of the remitter's balance is recorded by the remitter's blockchain account in the blockchain:

$(S\_A, S'\_A) = (r'\_A\ G + s\_A\ H, r'\_A\ Pk\_A).$

The commitment of the receiver's balance is recorded by the receiver's blockchain account in the blockchain:

$(S\_B, S'\_B) = (r'\_B\ G + s\_B\ H, r'\_B\ Pk\_B).$

The commitment of the remitter's balance $(S\_A, S'\_A)$ is calculated by the homomorphic encryption algorithm according to the remitter's balance s_A and the remitter's public key Pk_A. The commitment of the receiver's balance $(S\_B, S'\_B)$ is calculated by the homomorphic encryption algorithm according to the receiver's balance s_B and the receiver's public key Pk_B. A balance random number with respect to the remitter r'_A and a balance random number with respect to the receiver r'_B are random numbers used by the homomorphic encryption algorithm, and G, H are the two generators of the elliptic curve algorithm.

Step 302, generating a commitment of the transaction amount with respect to the remitter $(T\_A, T'\_A) = (r\_AG + t\_AH, r\_APk\_A)$ and the commitment of the transaction amount with respect to the receiver $(T\_B, T'\_B) = (r\_BG + t\_BH, r\_BPk\_B)$.

The commitment of the transaction amount with respect to the remitter $(T\_A, T'\_A)$ is calculated by the homomorphic encryption algorithm according to the transaction amount t_A and the remitter's public key Pk_A. The commitment of the transaction amount with respect to the receiver $(T\_B, T'\_B)$ is calculated by the homomorphic encryption algorithm according to the transaction amount t_B and the receiver's public key Pk_B, and t_B=t_A. The transaction amount random number with respect to the remitter r_A and the transaction amount random number with respect to the receiver r_B are the random numbers used by the foregoing homomorphic encryption algorithm. The two generators G, H of the foregoing elliptic curve algorithm are still used in the generation of the foregoing ciphertexts.

Further, in order to enable the other nodes in the blockchain to verify t_B=t_A, r=r_A−r_B is to be generated in the next step 303.

Step 303, generating a difference between the transaction amount random number with respect to the remitter and the transaction amount random number with respect to the receiver: r=r_A−r_B.

In some embodiments, in order to ensure that a remittance transaction is implemented smoothly, blockchain nodes may determine that the values of the remitted amount t_A and the account balance $s_A$ meet the following conditions: t_A≥0 and $s_A$-t_A≥0. In some embodiments, a range proof technology enables the blockchain nodes to verify whether the transaction meets preset conditions in a ciphertext state. For example, the Bulletproofs or the Borromean ring signature may be used to achieve this goal. The remitter may generate a range proof PR related to $(r_A, s_A, S_A, r, t\_A, T)$ for the blockchain nodes to verify if t_A≥0 and $s_A$−t_A≥0 are met in the subsequent process. For example, as shown in FIG. 3:

Step 304, generating a range proof RP1 to prove t_A≥0.

Step 305, generating a range proof RP2 to prove s_A−t_A≥0.

For the nodes in the blockchain to verify that the commitment of the transaction amount with respect to the receiver $(T\_B, T'\_B)$ is encrypted in the same encryption mode as the commitment of the receiver's balance ($s\_B$, $s'\_B$), and that the commitment of the transaction amount with respect to the receiver ($T\_B$, $T'\_B$) can be decrypted with the receiver's private key to correctly obtain the transaction amount, and for the nodes to update the account balance by using the transaction amount, the remitter may also generate a public key proof associated with the receiver, as shown in FIG. 3.

Step 306, generating a proof Pf to prove that ($T\_B$, $T'\_B$) is encrypted by using receiver's public key $Pk\_B$.

In some embodiments, generating the proof Pf may comprise: generating a pair of random numbers ($r'$, $t'$) where $r'$ is a first verification random number and $t'$ is a second verification random number; calculating the random number commitment $(T, T')=(r'\ G+t'\ H, r'\ Pk\_B)$ by the same homomorphic encryption algorithm as used in generating the commitment of the transaction amount with respect to the receiver, where $Pk\_B$ is the public key used in the commitment of the receiver's balance; calculating a hash $u=\mathrm{Hash}(T\_B, T'\_B, T, T')$, $v=u\ r\_B+r'$, $w=u\ t\_B+t'$, where Hash represents a hash operation, $v$ is the a verification element corresponding to the first verification random number $r'$, and $w$ is a second verification element corresponding to the second verification random number $t'$; generating $Pf=(T, T'; v, w)$.

Step 307, the remitter uses the private key corresponding to the remitter's public key $Pk\_A$ to sign ($A, T\_A, T'\_A; B, T\_B, T'\_B$) to generate a digital signature Sig_A, where A, B represent the identification information of the remitter and receiver respectively, such as the remitter's and the receiver's blockchain accounts or blockchain account addresses, respectively, to enable the other nodes in the blockchain to verify the remitter and the receiver involved in this transaction.

In some embodiments, the remitter's digital signature may endorse not only $A, T\_A, T'\_A, B, T\_B, T'\_B$, but also one or more of r, RP1, RP2, and Pf.

Step 308, the remitter submits the foregoing generated ciphertexts ($T\_A, T'\_A; T\_B, T'\_B$) as well as the identification information, such as the remitter's and the receiver's accounts or account addresses, in the format of a transaction to the blockchain network for the nodes in the blockchain to conduct consensus verification on this transaction. If the transaction is consensus-verified, it may be added to a new block of the blockchain, thus added in the distributed ledgers of the blockchain. In some embodiments, for the nodes in the blockchain to conduct consensus verification on this transaction, the generated proof parameters (r, RP1, RP2, Pf) and the digital signature Sig_A may be added into the content of the transaction.

In some embodiments, the remitter submits the transaction to the blockchain via a node 1 to execute the remittance. The transaction may be transmitted to all or some blockchain nodes in the blockchain network and the all or some blockchain nodes may verify the content and format of the transaction respectively and execute the remittance transaction when the verification is successful, or reject the remittance transaction when the verification is not successful.

Each of the blockchain nodes may be any blockchain node in a blockchain network. Every blockchain node in the blockchain network may receive the transaction, for example, ($A, T\_A, T'\_A; B, T\_B, T'\_B; r$, RP1, RP2, Pf; Sig_A), and conduct verification and other operations through Steps 309-312.

Step 309, the blockchain nodes check if the transaction has been executed.

In some embodiments, after the blockchain nodes receive the remittance transaction ($A, T\_A, T'\_A; B, T\_B, T'\_B; r$, RP1, RP2, Pf; Sig_A), the blockchain nodes may use the anti-double spending or anti-replay mechanism in blockchain-related technologies to verify if this remittance transaction has been executed. If this remittance transaction has been executed, the execution of this remittance transaction is repetitive and may be rejected. Otherwise the process moves to Step 310.

Step 310, the blockchain nodes check the signature Sig_A.

In some embodiments, the blockchain nodes may check if the signature Sig_A contained in the remittance transaction is correct. If the signature is not correct, the execution of this remittance transaction may be rejected. Otherwise the process proceeds to Step 311.

Step 311, the blockchain nodes verify whether $t\_A$ is equal to $t\_B$.

In some embodiments, whether $t\_A$ is equal to $t\_B$ can be verified by verifying whether $rG=T\_A-T\_B$ is correct. If not correct, the execution of this remittance transaction may be rejected. Otherwise, the process proceeds to Step 312.

Step 312, the blockchain nodes verify $t\_A \geq 0$;

In some embodiments, the blockchain nodes may check the range proof PR1 contained in this remittance transaction based on a range proof technology to determine whether $t\_A \geq 0$ is met. If the condition $t\_A \geq 0$ is not met, the execution of this remittance transaction may be rejected. Otherwise, the process proceeds to Step 313.

Step 313, the blockchain nodes verify $s\_A-t\_A \geq 0$;

In some embodiments, the blockchain nodes may check the range proof PR2 contained in this remittance transaction based on a range proof technology to determine whether $s\_A-t\_A \geq 0$ is met. If the condition $s\_A-t\_A \geq 0$ is not met, the execution of this remittance transaction may be rejected. Otherwise, the process proceeds to Step 314.

Step 314, the blockchain nodes verify whether the amount ciphertext ($T\_B$, $T'\_B$) is calculated by the homomorphic encryption algorithm based on the same public key $Pk\_B$ as the commitment of the receiver's balance ($s\_B$, $s'\_B$).

In some embodiments, the blockchain nodes may verify if $(vG+wH, v\ Pk\_B)=(uT\_B+T, uT'\_B+T')$ is correct for all parameters in the Pf contained in the remittance transaction. If not correct, the execution of this remittance transaction may be rejected. Otherwise, the process proceeds to Step 315.

Step 315, in the maintained blockchain ledgers, the blockchain nodes update the balances of the blockchain accounts associated with the user A and the user B respectively.

In some embodiments, after the verification in Steps 309~314 is successful, the blockchain nodes may deduct the commitment of the transaction amount with respect to the remitter ($T\_A$, $T'\_A$) from the balance commitment ($S\_A$, $S'\_A$) corresponding to the remitter's account balance $s\_A$ recorded in the blockchain ledger, and add the commitment of the transaction amount with respect to the receiver ($T\_B$, $T'\_B$) to the balance commitment ($S\_B$, $S'\_B$) corresponding to the receiver's account balance $s\_B$, so that the balance commitment in the blockchain account 1 associated with the user A is updated to $s\_A-t\_A$, and the balance commitment in the blockchain account 2 associated with the user B is updated to $s\_B+t\_B$, where $t\_A=t\_B$.

Based on the nature of homomorphic encryption algorithms, when the balance commitment ($S\_A$, $S'\_A$) is updated to $[(S\_A, S'\_A)-(T\_A, T'\_A)]$, since $(S\_A, S'\_A)-(T\_A, T\_A)=(S\_A-T\_A, S'\_A-T'\_A)$, and $(S\_A-T\_A, S'\_A-T'\_A)=(r'\_A-r\_A)G+(s\_A-t\_A)H$, $(r'\_A-r\_A)$ Pk_A), the remitter's account balance is updated to (s_A−t_A) after the consensus verification by the blockchain nodes succeeds, while the other nodes in the blockchain do not know the value of the remitter's account balance s_A and the transaction amount t_A remitted by the remitter.

Similarly, based on the nature of homomorphic encryption algorithms, when the balance commitment (S_B, S'_B) is updated to [(S_B, S'_B)+(T_B, T'_B)], since (S_B, S'_B)+(T_B, T'_B)=(S_B+T_B, S'_B+T'_B), and (S_B+T_B, S'_B+T'_B)=(r'_B+r_B)G+(s_B+t_B)H, (r'_B+r_B)Pk_B), the receiver's account balance is updated to (s_B+t_B) after the consensus verification by the blockchain nodes succeeds, while the other nodes in the blockchain do not know the value of the receiver's account balance s_B and the transaction amount t_B remitted by the remitter.

In some embodiments, in order to ensure that the receiver can conduct transfer transaction based on the receiver's account balance after accepting this transaction, the foregoing embodiments may comprise Step 316: the remitter may send the foregoing transaction amount random number with respect to the receiver r_B to the receiver via an off-chain channel.

In summary, the use of the homomorphic encryption mechanism allows the encryption of the balances in blockchain accounts and the encryption of the remitted amounts in the process of remittance transactions. The encrypted balance ciphertexts may be recorded in the blockchain accounts, and the encrypted remittance ciphertexts may be used in the implementation of remittance transactions. Therefore, the remittance transactions can be implemented successfully via the blockchain network without revealing the account balances and remitted amounts, and without affecting the blockchain nodes' verification of transaction conditions, thereby enabling the blockchain network to provide a privacy protection function. In the foregoing embodiments provided in the application, the remitter may generate a remittance transaction along with verification parameters and submits the transaction to the blockchain network, the other nodes in the blockchain may conduct consensus verification on the transaction content, and then the remittance operation can be completed. The entire process may not require the involvement of the receiver's node device, and may not rely on the receiver device and the network transmission of the receiver device, thereby eliminating the interference caused by an unconnected status of the receiver, a delay in response, network failure and latency, etc.

In some embodiments, the proofs or digital signatures (such as r, RP1, RP2, Pf and Sig_A) may be generated in an order different from the one described in FIG. 3. Similarly, the contents and the proofs or digital signatures in the transaction to the remitter may be verified by the nodes in the blockchain in a different order than the one described in FIG. 3.

Figure 4:
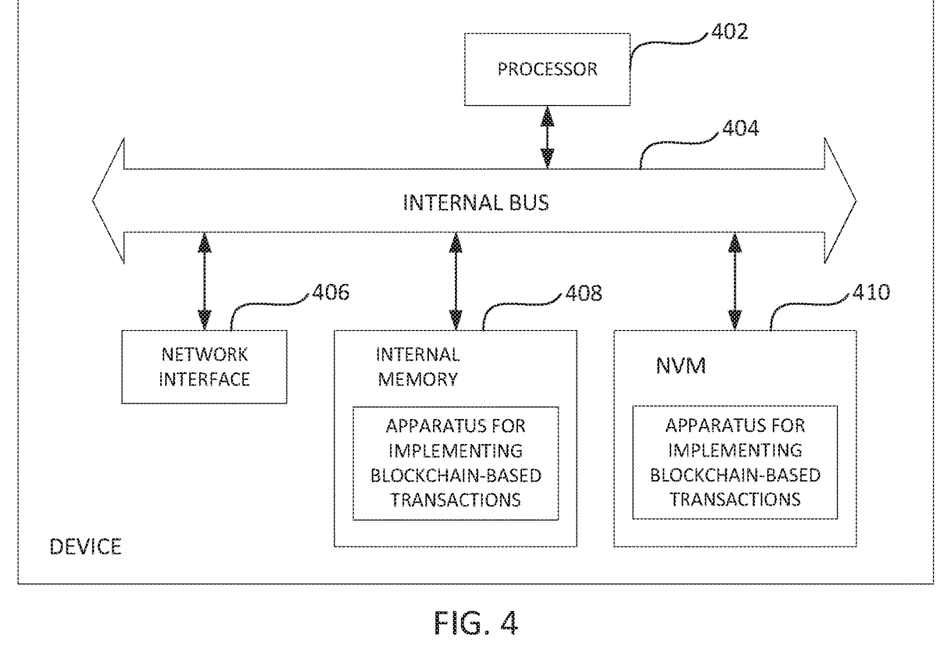
FIG. 4 is a schematic structural diagram of a device for implementing blockchain-based transactions according to some embodiments of the specification.

FIG. 4 is a schematic structural diagram of a device for implementing blockchain-based transactions according to some embodiments of the specification. As shown in FIG. 4, at the level of hardware, the device comprises a processor 402, an internal bus 404, a network interface 406, an internal memory 408, and a non-volatile memory (NVM) 410. The device may further comprise other pieces of hardware for transactions. The processor 402 reads a corresponding computer program from the NVM 410 to the internal memory 408 and then executes the computer program to form a blockchain transaction apparatus at a logical level. In addition to the software implementation manner, one or more of embodiments of the application do not exclude other implementation manners, such as a logic device or a combination of software and hardware. That is, the executive entities of the following processes are not limited to logical units, and may also be hardware or logic devices.

Figure 5:
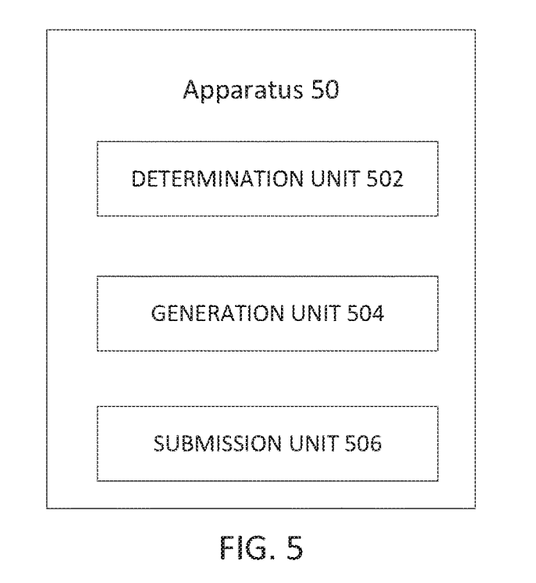
FIG. 5 is a block diagram of an apparatus for implementing blockchain-based transactions according to some embodiments of the specification.

Referring to FIG. 5, a block diagram of an apparatus for implementing blockchain-based transactions is provided according to some embodiments of the specification. As shown in FIG. 5, in the software implementation manner, the apparatus for implementing blockchain-based transactions is implemented as a remitter device 50 and may comprise: a determination unit 502 for determining a transaction amount to be remitted from a blockchain account of a remitter into a blockchain account of a receiver, wherein the blockchain account of the remitter records a homomorphic encryption ciphertext of the remitter's balance in a blockchain, the blockchain account of the receiver records a homomorphic encryption ciphertext of the receiver's balance in the blockchain, the homomorphic encryption ciphertext of the remitter's balance may be a commitment of the remitter's balance based on a public key of the remitter, and the homomorphic encryption ciphertext of the receiver's balance may be a commitment of a receiver's balance based on a public key of the receiver; a generation unit 504 for generating a homomorphic encryption ciphertext of the transaction amount with respect to the remitter and a homomorphic encryption ciphertext of the transaction amount with respect to the receiver, wherein the homomorphic encryption ciphertext of the transaction amount with respect to the remitter may be a commitment of the transaction amount based on the public key of the remitter, and the homomorphic encryption ciphertext of the transaction amount with respect to the receiver may be a commitment of the transaction amount based on the public key of the receiver; a submission unit 506 for submitting to the blockchain a transaction comprising information of the blockchain account of the remitter, information of the blockchain account of the receiver, the homomorphic encryption ciphertext of the transaction amount with respect to the remitter and the homomorphic encryption ciphertext of the transaction amount with respect to the receiver, for the homomorphic encryption ciphertext of the transaction amount with respect to the remitter to be subtracted from the homomorphic encryption ciphertext of the remitter's balance and for the homomorphic encryption ciphertext of the transaction amount with respect to the receiver to be added to the homomorphic encryption ciphertext of the receiver's balance.

In some embodiments, the commitment of the transaction amount with respect to the remitter is calculated by applying a homomorphic encryption algorithm according to the transaction amount random number with respect to the remitter, the transaction amount and the remitter's public key; and the commitment of the transaction amount with respect to the receiver is calculated by applying the homomorphic encryption algorithm according to the transaction amount random number with respect to the receiver, the transaction amount and the receiver's public key.

In some embodiments, the generation unit 504 may be configured to: determine a difference between the transaction amount random number with respect to the remitter and the transaction amount random number with respect to the receiver; add the difference between the transaction amount random number with respect to the remitter and the transaction amount random number with respect to the receiver in the transaction, for one or more blockchain nodes in the blockchain to verify that the transaction amount encrypted as the commitment of the transaction amount with respect to the remitter is equal to the transaction amount encrypted as the commitment of the transaction amount with respect to the receiver.

In some embodiments, the generation unit 504 may further be configured to: generate a public key proof associated with the receiver based on a homomorphic encryption algorithm and the homomorphic encryption ciphertext of the transaction amount with respect to the receiver; and add the public key proof associated with the receiver in the transaction, for one or more blockchain nodes in the blockchain to verify that the homomorphic encryption ciphertext of the transaction amount with respect to the receiver and the homomorphic encryption ciphertext of the receiver's balance are calculated by the homomorphic encryption algorithm based on a same public key.

In some embodiments, the generation unit 504 may further be configured to: generate a first verification random number and a second verification random number; generate a random-number homomorphic encryption ciphertext by the homomorphic encryption algorithm based on the first verification random number, the second verification random number and the public key of the receiver; obtain a hash digest by conducting a hash operation on the homomorphic encryption ciphertext of the transaction amount with respect to the receiver and the random-number homomorphic encryption ciphertext; generate a first verification element associated with the first verification random number and a second verification element associated with the second verification random number according to the hash digest, wherein the public key proof associated with the receiver comprises the random number commitment ciphertext, the first verification element and the second verification element.

In some embodiments, the commitment of the remitter's balance is calculated by a homomorphic encryption algorithm according to the remitter's balance, the remitter's public key and a remitter random number.

In some embodiments, the generation unit 504 may further be configured to: generating a range proof related to the remitter's balance and the transaction amount with respect to the remitter; and add the range proof to the transaction for the one or more blockchain nodes in the blockchain to verify whether the transaction amount is no smaller than zero and no greater than the remitter's balance.

In some embodiments, the generation unit 504 may further be configured to: generate a digital signature of the remitter endorsing the homomorphic encryption ciphertext of the transaction amount with respect to the remitter and the homomorphic encryption ciphertext of the transaction amount with respect to the receiver based on a private key of the remitter; add the digital signature of the remitter to the transaction for one or more blockchain nodes in the blockchain to verify the digital signature of the remitter.

In some embodiments, the foregoing apparatus further comprises: an off-chain sending unit for sending the transaction amount random number with respect to the receiver to the receiver via an off-chain channel.

For details of how the functions and roles of the units of the foregoing apparatus are implemented, the embodiments of the foregoing method may be referenced to.

The systems, apparatuses, modules or units described in the foregoing embodiments may be achieved by computer chips or entities, or by products with certain functions. A typical achievement device is a computer. An example of the computer may be a personal computer, a laptop computer, a cell phone, a camera phone, a smart phone, a PDA (personal digital assistant), a media player, a navigation device, an email sending and receiving device, a game console, a tablet computer, a wearable device or any combination of a few of these devices.

The embodiments of the application also provide a computer device which comprises a memory and a processor, where the memory is configured with computer programs which can be executed by the processor, and the processor executes the computer programs to achieve the steps of the methods of blockchain transactions in the embodiments of the application. The steps of the method for implementing blockchain-based transactions are detailed in the foregoing description.

The foregoing descriptions are embodiments of the application and are not intended to limit the application. All modifications, equivalent replacements and improvements made without departing from the spirit and principle of the application shall fall within the scope of the application.

In a typical configuration, a computing device comprises one or more of processors (CPU), I/O interfaces, network interfaces and internal memories. The internal memory may be in a form of volatile memory, random access memory (RAM) and/or non-volatile memory such as read-only memory (ROM) or flash memory (flash RAM) in computer readable media. Internal memory is an example of the computer readable media.

Computer readable media include non-volatile and volatile, movable and non-movable media and may achieve information storage by any method or technology. Information may be computer readable instructions, data structures, program modules or other data.

Examples of computer storage media include, but are not limited to, phase change random access memory (PRAM), static random access memory (SRAM), dynamic random access memory (DRAM), other types of random access memory (RAM), read only memory (ROM), electrically erasable programmable read only memory (EEPROM), flash memory or other memory technologies, compact disc-read only memory (CD-ROM), digital versatile disc (DVD) or other optical memory, cassette type magnetic tape, magnetic disk memory, magnetic tape, magnetic disc storage or other magnetic storage devices or any other non-transmission media, which may be used to store information that is accessible to computer devices. According to the specification, computer readable media do not include transitory media, such as modulated data signals and carriers.

It should be further noted that the terms "include," "contain" or any variants thereof are intended to cover non-exclusive inclusion so that a process, method, product or device that includes a set of elements not only includes those elements but also includes other elements that are not expressly listed, or also includes the elements inherent to such process, method, product or device. In the absence of more limitations, the elements defined by the sentence "include one . . . " do not exclude that other equivalent elements are included in the process, method, product or device.

One of ordinary skill in the art should understand that the embodiments of the application may be provided as a method, a system or a computer program product. Therefore, the embodiments of the application may be entire hardware embodiments, entire software embodiments or embodiments combining hardware and software. Further, the embodiments of the application may adopt the form of a computer program product implemented on one or more of computer usable storage media (including, but not limited to, magnetic disk memory, CD-ROM and optical memory) containing computer readable program codes.

What is claimed is:

1. A computer-implemented method for implementing blockchain-based transactions, comprising:
   determining, by a first computing device associated with a remitter, a transaction amount to be remitted from a blockchain account of the remitter into a blockchain account of a receiver, wherein the blockchain account of the remitter and the blockchain account of the receiver respectively record a homomorphic encryption ciphertext of the remitter's balance and a homomorphic encryption ciphertext of the receiver's balance in a blockchain;
   generating, by the first computing device applying a homomorphic encryption algorithm, a homomorphic encryption ciphertext of the transaction amount with respect to the remitter based on a transaction amount random number with respect to the remitter, the transaction amount, and a public key of the remitter;
   generating, by the first computing device applying the homomorphic encryption algorithm, a homomorphic encryption ciphertext of the transaction amount with respect to the receiver based on a transaction amount random number with respect to the receiver, the transaction amount, and a public key of the receiver;
   sending, by the first computing device, the transaction amount random number with respect to the receiver to a second computing device associated with the receiver via a channel off the blockchain;
   determining, by the first computing device, a difference between the transaction amount random number with respect to the remitter and the transaction amount random number with respect to the receiver;
   generating, by the first computing device, a first verification random number and a second verification random number;
   applying, by the first computing device, the homomorphic encryption algorithm to generate a random-number homomorphic encryption ciphertext based on the first verification random number, the second verification random number, and the public key of the receiver;
   obtaining, by the first computing device, a hash digest by conducting a hash operation on the homomorphic encryption ciphertext of the transaction amount with respect to the receiver and the random-number homomorphic encryption ciphertext;
   generating, by the first computing device, a first verification element associated with the first verification random number and a second verification element associated with the second verification random number according to the hash digest;
   generating, by the first computing device, a public key proof associated with the receiver, wherein the public key proof comprises the first verification element and the second verification element; and
   submitting, by the first computing device via a blockchain network, to the blockchain a transaction comprising information of the blockchain account of the remitter, information of the blockchain account of the receiver, the homomorphic encryption ciphertext of the transaction amount with respect to the remitter, the homomorphic encryption ciphertext of the transaction amount with respect to the receiver, the difference between the transaction amount random number with respect to the remitter and the transaction amount random number with respect to the receiver, and the public key proof.

2. The computer-implemented method of claim 1, wherein the homomorphic encryption ciphertext of the remitter's balance is a commitment of the remitter's balance, and the homomorphic encryption ciphertext of the receiver's balance is a commitment of the receiver's balance.

3. The computer-implemented method of claim 1, wherein the homomorphic encryption ciphertext of the remitter's balance is a Pedersen Commitment of the remitter's balance, and the homomorphic encryption ciphertext of the receiver's balance is a Pedersen Commitment of the remitter's balance.

4. The computer-implemented method of claim 1, before submitting the transaction to the blockchain, further comprising:
   generating, by the first computing device, a range proof related to the remitter's balance and the transaction amount with respect to the remitter, wherein the transaction further comprises the range proof.

5. The computer-implemented method of claim 1, wherein the homomorphic encryption ciphertext of the transaction amount with respect to the remitter is a commitment of the transaction amount with respect to the remitter based on the public key of the remitter, and the homomorphic encryption ciphertext of the transaction amount with respect to the receiver is a commitment of the transaction amount with respect to the receiver based on the public key of the receiver.

6. The computer-implemented method of claim 1, before submitting the transaction to the blockchain, further comprising:
   generating, by the first computing device, a digital signature of the remitter endorsing the homomorphic encryption ciphertext of the transaction amount with respect to the remitter and the homomorphic encryption ciphertext of the transaction amount with respect to the receiver based on a private key of the remitter, wherein the transaction further comprises the digital signature.

7. An apparatus for implementing blockchain-based transactions, comprising: one or more processors and one or more non-transitory computer-readable memories coupled to the one or more processors and storing instructions that, when executed by the one or more processors, cause the apparatus to perform operations comprising:
   determining a transaction amount to be remitted from a blockchain account of a remitter into a blockchain account of a receiver, wherein the blockchain account of the remitter and the blockchain account of the receiver respectively record a homomorphic encryption ciphertext of the remitter's balance and a homomorphic encryption ciphertext of the receiver's balance in a blockchain;
   generating, by applying a homomorphic encryption algorithm, a homomorphic encryption ciphertext of the transaction amount with respect to the remitter based on a transaction amount random number with respect to the remitter, the transaction amount, and a public key of the remitter;
   generating, by applying the homomorphic encryption algorithm, a homomorphic encryption ciphertext of the transaction amount with respect to the receiver based on a transaction amount random number with respect to the receiver, the transaction amount, and a public key of the receiver;
   sending the transaction amount random number with respect to the receiver to a computing device associated with the receiver via a channel off the blockchain;

determining a difference between the transaction amount random number with respect to the remitter and the transaction amount random number with respect to the receiver;
generating a first verification random number and a second verification random number;
applying the homomorphic encryption algorithm to generate a random-number homomorphic encryption ciphertext based on the first verification random number, the second verification random number, and the public key of the receiver;
obtaining a hash digest by conducting a hash operation on the homomorphic encryption ciphertext of the transaction amount with respect to the receiver and the random-number homomorphic encryption ciphertext;
generating a first verification element associated with the first verification random number and a second verification element associated with the second verification random number according to the hash digest;
generating a public key proof associated with the receiver, wherein the public key proof comprises the first verification element and the second verification element; and
submitting, via a blockchain network, to the blockchain a transaction comprising information of the blockchain account of the remitter, information of the blockchain account of the receiver, the homomorphic encryption ciphertext of the transaction amount with respect to the remitter, the homomorphic encryption ciphertext of the transaction amount with respect to the receiver, the difference between the transaction amount random number with respect to the remitter and the transaction amount random number with respect to the receiver, and the public key proof.

8. The apparatus of claim 7, wherein the homomorphic encryption ciphertext of the remitter's balance is a commitment of the remitter's balance, and the homomorphic encryption ciphertext of the receiver's balance is a commitment of the receiver's balance.

9. The apparatus of claim 7, wherein the homomorphic encryption ciphertext of the remitter's balance is a Pedersen Commitment of the remitter's balance, and the homomorphic encryption ciphertext of the receiver's balance is a Pedersen Commitment of the remitter's balance.

10. The apparatus of claim 7, wherein the homomorphic encryption ciphertext of the transaction amount with respect to the remitter is a commitment of the transaction amount with respect to the remitter based on the public key of the remitter, and the homomorphic encryption ciphertext of the transaction amount with respect to the receiver is a commitment of the transaction amount with respect to the receiver based on the public key of the receiver.

11. The apparatus of claim 7, wherein the operations further comprise, before submitting the transaction to the blockchain:
generating a range proof related to the remitter's balance and the transaction amount with respect to the remitter, wherein the transaction further comprises the range proof.

12. A non-transitory computer-readable storage medium storing instructions that, when executed by one or more processors, cause the one or more processors to perform operations comprising:
determining a transaction amount to be remitted from a blockchain account of a remitter into a blockchain account of a receiver, wherein the blockchain account of the remitter and the blockchain account of the receiver respectively record a homomorphic encryption ciphertext of the remitter's balance and a homomorphic encryption ciphertext of the receiver's balance in a blockchain;
generating, by applying a homomorphic encryption algorithm, a homomorphic encryption ciphertext of the transaction amount with respect to the remitter based on a transaction amount random number with respect to the remitter, the transaction amount, and a public key of the remitter;
generating, by applying the homomorphic encryption algorithm, a homomorphic encryption ciphertext of the transaction amount with respect to the receiver based on a transaction amount random number with respect to the receiver, the transaction amount, and a public key of the receiver;
sending the transaction amount random number with respect to the receiver to a computing device associated with the receiver via a channel off the blockchain;
determining a difference between the transaction amount random number with respect to the remitter and the transaction amount random number with respect to the receiver;
generating a first verification random number and a second verification random number;
applying the homomorphic encryption algorithm to generate a random-number homomorphic encryption ciphertext based on the first verification random number, the second verification random number, and the public key of the receiver;
obtaining a hash digest by conducting a hash operation on the homomorphic encryption ciphertext of the transaction amount with respect to the receiver and the random-number homomorphic encryption ciphertext;
generating a first verification element associated with the first verification random number and a second verification element associated with the second verification random number according to the hash digest;
generating a public key proof associated with the receiver, wherein the public key proof comprises the first verification element and the second verification element; and
submitting, via a blockchain network, to the blockchain a transaction comprising information of the blockchain account of the remitter, information of the blockchain account of the receiver, the homomorphic encryption ciphertext of the transaction amount with respect to the remitter, the homomorphic encryption ciphertext of the transaction amount with respect to the receiver, the difference between the transaction amount random number with respect to the remitter and the transaction amount random number with respect to the receiver, and the public key proof.

13. The non-transitory computer-readable storage medium of claim 12, wherein the homomorphic encryption ciphertext of the remitter's balance is a commitment of the remitter's balance, and the homomorphic encryption ciphertext of the receiver's balance is a commitment of the receiver's balance.

14. The non-transitory computer-readable storage medium of claim 12, wherein the homomorphic encryption ciphertext of the remitter's balance is a Pedersen Commitment of the remitter's balance, and the homomorphic encryption ciphertext of the receiver's balance is a Pedersen Commitment of the remitter's balance.

15. The non-transitory computer-readable storage medium of claim 12, wherein the operations further comprise, before submitting the transaction to the blockchain:
  generating a range proof related to the remitter's balance and the transaction amount with respect to the remitter, wherein the transaction further comprises the range proof.

16. The non-transitory computer-readable storage medium of claim 12, wherein the homomorphic encryption ciphertext of the transaction amount with respect to the remitter is a commitment of the transaction amount with respect to the remitter based on the public key of the remitter, and the homomorphic encryption ciphertext of the transaction amount with respect to the receiver is a commitment of the transaction amount with respect to the receiver based on the public key of the receiver.

17. The non-transitory computer-readable storage medium of claim 12, wherein the operations further comprise, before submitting the transaction to the blockchain:
  generating a digital signature of the remitter endorsing the homomorphic encryption ciphertext of the transaction amount with respect to the remitter and the homomorphic encryption ciphertext of the transaction amount with respect to the receiver based on a private key of the remitter, wherein the transaction further comprises the digital signature.

18. The apparatus of claim 7, wherein the operations further comprise, before submitting the transaction to the blockchain:
  generating a digital signature of the remitter endorsing the homomorphic encryption ciphertext of the transaction amount with respect to the remitter and the homomorphic encryption ciphertext of the transaction amount with respect to the receiver based on a private key of the remitter, wherein the transaction further comprises the digital signature.

* * * * *